July 30, 1940.　　　　A. L. FLAMM　　　　2,209,677

TOASTER OR GRILL

Filed Nov. 17, 1937

INVENTOR.
ALEXANDER L. FLAMM
BY
John A. Hanrahan
ATTORNEY.

Patented July 30, 1940

2,209,677

UNITED STATES PATENT OFFICE 2,209,677

TOASTER OR GRILL

Alexander L. Flamm, Fairfield, Conn.

Application November 17, 1937, Serial No. 175,093

8 Claims. (Cl. 219—19)

This invention relates to new and useful improvements in grills and toasters and has particular relation to electric grills and toasters.

The objects and advantages of the invention will become apparent from a consideration of the following detailed description taken in connection with the accompanying drawing wherein a satisfactory embodiment of the invention is shown. However it is to be understood that the invention is not limited to the details disclosed but includes all such variations and modifications as fall within the spirit of the invention and the scope of the appended claims.

Figure 1:
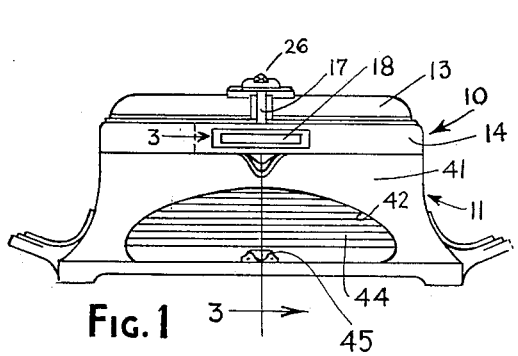
Fig. 1 is a front elevational view of my improved toaster and/or grill.
Figure 2:
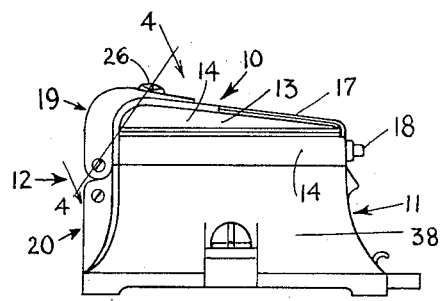
Fig. 2 is an end elevational view thereof.

Referring in detail to the drawing my improved toaster or grill as shown comprises a body including upper and lower portions 10 and 11 connected at their rear sides as by a hinge 12. The upper body portion 10 comprises a top shell-like section 13 and a section or part 14 carrying a grill surface member 15 and a heating element 16 at the upper side of such member 15. Shell section 13 may have ornamental ribs 17 and the section or part 14 may be provided with a hand piece 18 for swinging the upper portion 10 about the hinge 12, to and from open position.

Figure 4:
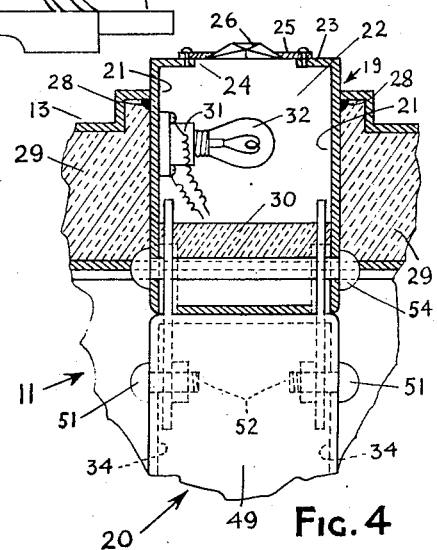
Fig. 4 is a detail sectional view on an enlarged scale, the view being taken as along the line 4—4 of Fig. 2.

Hinge 12 includes upper and lower parts 19 and 20 secured to the upper and lower toaster or grill portions 10 and 11 respectively. Hinge part 19 is bent up from a piece of sheet metal and is generally U-shaped in transverse section as shown best in Fig. 4. There it will be seen that the side portions or arms 21 of hinge part 19 are carried into the shell-like section 13 defining a channel or chamber 22 therein. In the upper or outer wall 23 of the mentioned hinge part an opening 24 is provided and is normally closed by a plate 25 carrying a lens or bull's-eye 26 which preferably is red in color.

The upper wall of the section 13 is cut away to receive the arms 21 of the hinge part 19 and the edges of the cut are welded or otherwise secured to said arms as at 28. The shell-like section 13 is at the sides of the arms 21 completely or at least partly filled with heat insulating material 29 and the space between the inner or lower portions of such arms also contains insulating material as at 30. Thus the channel or chamber 22 is insulated from the heating element 16. In such channel or chamber is arranged a socket 31 receiving a light bulb 32 preferably located directly inwardly of the lens 26. Obviously on removal of the plate 25 carrying the lens 26 access may be had to the bulb 32 whereby the same may be replaced whenever necessary.

Lower hinge part 20 is also of sheet metal and substantially U-shaped in transverse section and includes side arms or portions 34 which may be welded or otherwise secured to the lower toaster portion 11. Portion 11 includes a grill surface member 36 below which is located a heating element 37 and the portion also includes end walls 38 and a rear wall 39 extending below the heating element 37 and defining a chamber 40 located below the heating element 37 and closed on all but its front side, its front side wall 41 being provided with an opening 42 giving access to the chamber 40.

Within section 11 at the sides of the chamber 40 are arranged tracks or guide ways 43 in which is slidable a closure 44. Such closure may have a handle 45 for its manipulation and from a comparison of Figs. 1 and 3 it will be apparent that the closure 44 is adapted to be slid from a closed position as in Fig. 1 to an open position, being partly open in Fig. 3. It is but necessary to slide the closure 44 along the tracks or guide ways 43 to expose the opening 42, giving access to the chamber 40, or to close such opening.

Figure 3:
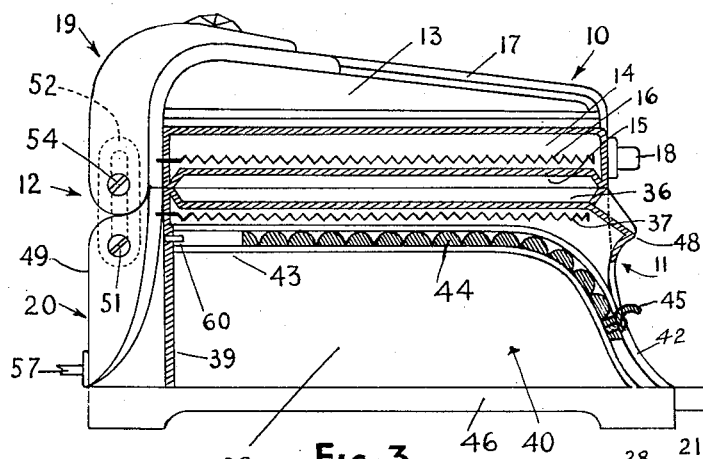
Fig. 3 is a transverse sectional view, on an enlarged scale, the view being taken as along the line 3—3 of Fig. 1.
Figure 5:
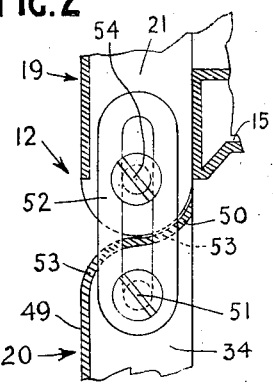
Fig. 5 is a detail sectional view of a hinge employed, the view being on an enlarged scale.

The chamber 40 includes a lower or bottom wall 46 which preferably extends beyond the front face of the wall 41 as shown at 47 in Fig. 3 whereby when the closure 44 is open and the grill surfaces are being used to grill food a receptacle placed on such extension is positioned below the lip 48 to catch any melted butter or the like passing outwardly through such lip.

Hinge part 20 includes a vertical or outer wall 49 which is carried upwardly at 50 to extend under the lower end of the hinge part 19. Bolts 51 passing through the arms 34 of hinge part 20 secure in place links 52 extending through slots 53 in portion 50 and project into the space between the arms 21 of the hinge part 19. Bolts 51 clamp the links 52 in place and a bolt or pin 54 passing through the side arms 21 of the hinge part 19 pivotally connects such part with the links 52 for swinging movement relative thereto and also the pin being movable along the slots in the links the hinge part 19, and thus the upper toaster portion 10, may be adjusted vertically with respect to the hinge part 20 and the lower toaster portion 10. This provides for the separation of the grill surfaces 15 and 36 for the reception of sandwiches or the like between them.

A lead in wire from any suitable source of electric energy passes into the toaster through the hinge 12. The wires are carried through the hollow hinge parts as through the channel 22 to the lamp base 31 and to the heating elements 16 and 37. Also heating elements 55 are located in the end walls 38 of the chamber 40.

Figure 6:
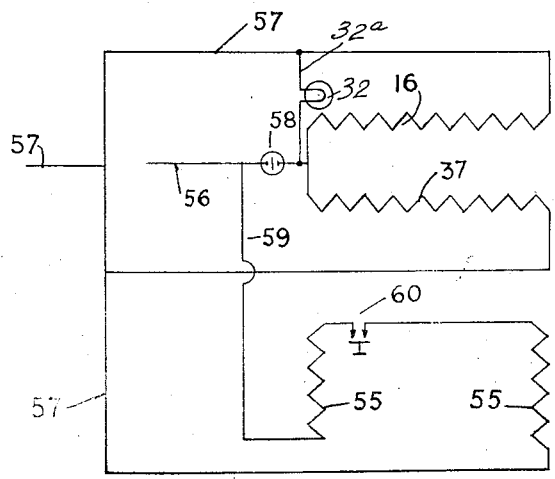
Fig. 6 shows the wiring diagram.

The wiring diagram is shown in Fig. 6 wherein a lead in wire 56 from a suitable source of electrical energy extends to a switch 58. Switch 58 may be a snap switch and controls the circuit to the heating elements 16 and 37. A lead 59 connected with wire 56 leads to the heating elements 55 at the ends of the chamber 40. A push button type of switch 60 is provided and as shown in Fig. 3 is located to be engaged by the closure 44 when the latter is moved to fully open position. This switch 60 is normally closed but on being engaged by the closure 44, when the latter is moved to open position, breaks the circuit to the heating elements 55. The return wire for the circuits is shown at 57.

A wire 32a is connected in parallel with the wires 56 and 57 and the lamp socket 31 is connected with the wire 32a. It is noted that wire 32a connects with the wire 56 at the inner side of the switch 58 whereby bulb 32 is to be energized when the elements 16 and 37 are energized.

It is noted that the elements 55 may be energized independent of the elements 16 and 37 and that such latter elements may be energized independent of elements 55. Further the signal bulb 32 will be energized whenever the heating elements 16 or 37 are energized. As the heating element 37 will (depending upon the location and amount of insulation employed) serve to heat chamber 40 to some extent the elements 55 may be omitted in certain constructions if so desired.

The chamber 40 comprises a heating chamber or a chamber for warming purposes as for example, to keep one sandwich or the like warm while another is being prepared. While the present drawing shows an appliance which in addition to being a toaster is also a grill, because of surfaces 15 and 36 it will be understood that certain features of the invention are adapted to toasters not including a grill. Therefore the invention is not to be considered as limited to a combination toaster and grill as herein disclosed.

Having thus set forth the nature of my invention, what I claim is:

1. In an appliance of the character described, a body having an upper grill surface, a member to be disposed over said body with its lower surface above said grill surface, said member having its lower surface comprising a grill surface, a hollow raised ornamental rib located intermediate the ends of said member and extending across the top and down the rear side thereof, means defining an insulated chamber in the rib portion extending across the top of said member, a signal light in said chamber, a lens in the upper wall of said chamber, a hollow raised ornamental rib on the rear side of said body intermediate the ends thereof, and an extensible hinge concealed by said rear ribs and connecting said body and member.

2. In an appliance of the character described, a base, a housing over said base and having an open front and comprising end, rear and top walls, said top wall comprising a grill surface, said housing in cooperation with said base defining a warming chamber of which said base is the floor, said housing having an opening providing an entrance to said chamber, guides within said chamber on the inner sides of the end walls of the housing, and a closure slidable on said guides between an open position within said chamber and a closed position closing said entrance to the chamber.

3. In an appliance of the character described, a base, a housing over said base and having an open front and comprising end, top and rear walls, said top wall comprising a grill surface, said housing in cooperation with said base defining a warming chamber of which said base is the floor, guides within said chamber on the inner sides of the end walls of the housing, said housing having an opening in a wall thereof providing an entrance to said chamber, a closure slidable on said guides between an open position within said chamber and a closed position closing said entrance to the chamber, a member hinged to said housing and disposable against the upper side thereof, and a lower grill surface on said member.

4. In a toaster or grill, a body comprising upper and lower portions each having a grill surface, an enclosed heating element in each of said portions for heating the respective grill surfaces, a hollow raised ornamental rib on one of said portions and having an opening through an outer wall thereof, heat insulating means defining a chamber in said rib, a power line entering said body and connected with said elements, a lens in said opening, and a light bulb in said chamber and connected with said power line to be energized when said elements are energized.

5. In an appliance of the character described, a base, a housing over said base and having an open front and comprising end, rear and top walls, said top wall comprising a grill surface, a heating element below said surface, said housing cooperating with said base and defining a warming chamber below said heating element, guides on the inner sides of the end walls of said housing, and a closure slidable on said guides between a closed position closing said front of the housing and an open position within the housing and defining the upper wall of said chamber below said heating element.

6. In an appliance of the character described, a body having an upper grill surface, a warming chamber in said body below said surface, a member to be disposed over said body with its lower surface above said grill surface, said member having its lower surface comprising a grill surface, a hollow rib on the rear side of said body, and substantially closed at its upper end, a hollow rib on the rear side of said member and in alignment with the rib on the body and substantially closed at its lower end, an element secured in the rib on the body and having a slotted portion extending into the rib on the member, a pin carried by said rib on the member and extending into said slot whereby said body and member are connected by an extensible hinge, and said rib on the member slotted in its lower end portion for the entrance of said element into such rib and to permit of swinging movement of the member on said pin relative to the body.

7. In an appliance of the character described, a base, a housing over said base and comprising end, front, rear and top walls, said top wall comprising a grill surface, said housing in cooperation with said base defining a warming chamber of which said base comprises the floor, said front wall of the housing having an opening therein extending upwardly from the base, a movable closure for said opening, a lip extending forwardly and downwardly to act as a drain for said grill surface, and said base including a portion extending forwardly of said front wall whereby when said closure is open a plate may be disposed on said base partly within said chamber and partly on said extension to catch the drip from said lip.

8. In a toaster or grill, a body comprising upper and lower portions each having a grill surface, an enclosed heating element in each of said portions for heating the respective grill surfaces, said upper portion having an opening in its top wall, heat insulating means defining a chamber in said upper portion in alignment with said opening, a power line entering said body and connected with said elements, a lens in said opening, and a light bulb in said chamber and connected with said power line to be energized when said elements are energized and insulated from said elements by said insulating means.

ALEXANDER L. FLAMM.